(12) United States Patent  (10) Patent No.: US 8,126,252 B2
Abernethy et al.  (45) Date of Patent: Feb. 28, 2012

(54) METHOD AND SYSTEM FOR ENHANCED CHECK IMAGE PRIVACY (75) Inventors: George Miller Abernethy, Charlotte, NC (US); Matthew A. Calman, Charlotte, NC (US); Kathryn B. Carmody, St. Louis, MO (US); Gregory Tyrone Domally, Beltsville, MD (US); Lowell R. Huff, Manchester, MO (US); Clarence E. Lee, II, Arlington, TX (US); Joseph P. Shuster, Charlotte, NC (US); Carol W. Wiles, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 942 days.

(21) Appl. No.: 11/553,269

(22) Filed: Oct. 26, 2006

(65) Prior Publication Data

US 2008/0101680 A1    May 1, 2008
US 2010/0208976 A2    Aug. 19, 2010

(51) Int. Cl.
    *G06K 9/00* (2006.01)
(52) U.S. Cl. ..................................................... 382/139
(58) Field of Classification Search .................. 382/139, 382/112, 140; 235/379
    See application file for complete search history.

(56) References Cited

U.S. PATENT DOCUMENTS 5,729,621 A *  3/1998  Marshall et al. ............... 382/139
5,940,844 A *  8/1999  Cahill et al. .................. 715/268
6,014,454 A    1/2000  Kunkler
6,351,553 B1   2/2002  Hayosh
6,863,214 B2   3/2005  Garner, IV et al.
2004/0247168 A1* 12/2004 Pintsov et al. ................. 382/137
2005/0139671 A1  6/2005  McGlamery et al.
2007/0140545 A1* 6/2007  Rossignoli .................... 382/139

FOREIGN PATENT DOCUMENTS

EP    0115189    8/1984

OTHER PUBLICATIONS

Bank of America Corporation, PCT International Search Report, issued in corresponding International Patent Application No. PCT/US07/82536, Oct. 3, 2008.
Bank of America Corporation, PCT Written Opinion, issued in corresponding International Patent Application No. PCT/US07/82536, Oct. 3, 2008.
EP Search Report for EP 07844605 date Sep. 27, 2011.

* cited by examiner

*Primary Examiner* — Vu Le
*Assistant Examiner* — Amara Abdi
(74) *Attorney, Agent, or Firm* — Moore & Van Allen PLLC; Ryan Harris (57) ABSTRACT A method and system for enhanced check image privacy are disclosed. Embodiments of the present invention provide a way to automatically link the results from quality assurance software to a check image archive to appropriately mark images as unretrievable by customers. Images are interrogated with a data matching algorithm to determine whether a confidence score expressing a likelihood that the image matches associated, stored magnetic ink character recognition (MICR) data is below a pre-set threshold. The image can be then automatically designated in the financial document archive. The image can be displayed to an operator for analysis when the confidence score is above the pre-set threshold and below a pre-set limit, or in cases where the confidence score cannot be determined by the data matching algorithm.

25 Claims, 4 Drawing Sheets

METHOD AND SYSTEM FOR ENHANCED CHECK IMAGE PRIVACY

BACKGROUND

Financial institutions have established various processes related to the exchange of documents evidencing monetary transactions. Such documents have historically been encoded with magnetic ink so that information from the documents can be read by machine. Such documents have thus become known as magnetic ink character recognition (MICR) documents. The MICR information is sometimes called the MICR "codeline" since it appears in a line across the bottom of a check. Check processing and sorting systems have also been developed in which a check or similar MICR document has its image captured and stored electronically. Such an image can be archived so that it is indexed with its accompanying data from the MICR read.

In high-speed check processing, errors occur where the image captured for a check is stored and indexed with MICR information for a different account. Typically, such an error occurs due to either a "piggyback" where half of one check overlays another in a sorting and/or imaging system, or an image that was not properly recovered while clearing a jam, thus causing the images and MICR codeline data being processed to lose synchronization. Modern banks typically provide on-line banking systems to customers so that customers can retrieve stored images of their checks. If an image is indexed with incorrect account information, it can be retrieved by the incorrect customer, resulting in a privacy breach.

To detect these defects and prevent such privacy breaches, commercially available image quality assurance software employs technology which compares the magnetically captured MICR data with data obtained from an optical recognition of the printed digits in the image to ensure the data from the two sources is the same. If the data does not appear to be an exact match, the problem is referred to a human operator to determine if there is a problem such that the customer should be kept from viewing the image. The operator then either marks the image appropriately in the bank's own archive, or notifies the bank's archive service provider of the problem so that the image can be appropriately designated.

SUMMARY

Embodiments of the present invention provide a way to automatically link the results from quality assurance software like that described above to a check image archive to automatically mark images as unretrievable by customers. Thus, operator intervention can be substantially reduced. In effect, an automatic control feedback loop is created between an image transaction management platform and an image archive to aid in reducing privacy breaches caused by check images being retrieved against an incorrect account.

In example embodiments, a method of restricting access to images in a financial document archive includes interrogating an image with a data matching algorithm to determine whether a confidence score expressing a likelihood that the image matches stored magnetic ink character recognition (MICR) data is below a pre-set threshold. The image in the financial document archive can be then automatically be marked or designated by the system as unretrievable so that the image cannot be viewed by customers. In this situation, no operator intervention is required.

In some embodiments, the image can be displayed to an operator when the confidence score is above the pre-set threshold and below a pre-set limit and in that case, the image can be marked according to an indication made by the operator. An operator can also provide the review in cases where the confidence score cannot be determined by the data matching algorithm for some reason. In any of these cases, provision can be made to send data describing defects in the image to the financial document archive.

In example embodiments, the methods of the invention can be implemented in a system including an image transaction platform for retrieving the images. This platform may be implemented via a computer system such as a mainframe computer system. An image quality inspection platform can be connected to the image transaction system to interrogate the images with a data matching algorithm and determine the confidence score. Connectivity to an image archive to mark images as unretrievable is provided in such an embodiment.

In at least some embodiments, the image quality inspection platform may be implemented on one or more servers interconnected with image quality inspection platforms used to display images to an operator if necessary. Additionally, both long term and short term image archive databases can be used. The invention can be implemented via appropriate software or computer program code instructions. These instructions may be in the form of a computer program product, which is installed to run on the servers discussed above. The combination of hardware and software to perform the functions described can form the means to carry out the processes of the invention.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields. Such data processing systems have historically been produced by the International Business Machines (IBM) Corporation. CIMS is today produced and marketed by Carreker Corporation of Dallas, Tex., U.S.A. Carreker and their products are well-known throughout the financial services industry.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. A well-known industry standard format for a cash letter file that contains both images and all data necessary to index and understand the images is the X9.37i format, which is promulgated by the American National Standards Institute (ANSI).

Check images as described in some example embodiments can be stored in either or both of a short-term image archive and a long-term image archive. For purposes of the example embodiments described herein, a short-term archive is a repository that houses images and their associated index/electronic data to provide an interim storage facility from which images and image data can be readily accessed and modified by interfacing applications prior to migration to long-term storage. This short-term repository can reside on a mainframe computer system or in a client/server based environment. A long-term image archive is a storage facility that houses images and their associated index/electronic data to provide permanent storage of images and image data, in their final form. The term "permanent" invokes the period of time the image exists in the archive prior to deletion; that time period would be determined by legal, customer, and industry parameters. The long term facility/repository can reside on a mainframe computer system or in a client/server based environment.

Figure 1:
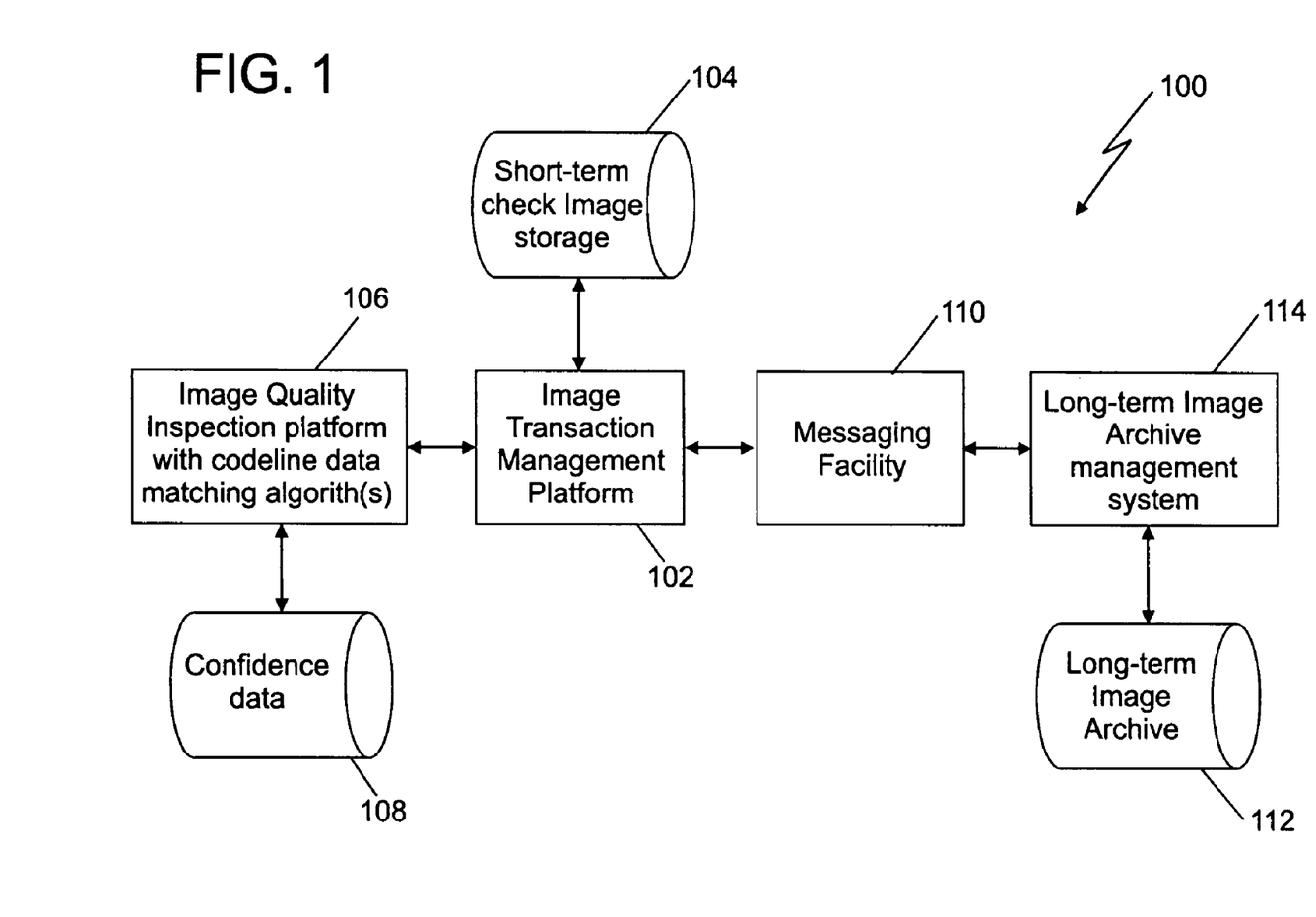
FIG. 1 is a high-level, system block diagram for example embodiments of the invention.

FIG. 1 presents a high-level system block diagram according to example embodiments of the invention. System 100 includes an image transaction management platform, 102, controlling the flow of image transactions through the enterprise, capable of dispatching and receiving data from other applications and image storage archives. In at least some embodiments such a platform can be a mainframe computer system with appropriate associated applications such as the previously mentioned CPCS and CIMS. Short-term check image storage 104 is for storing images and related data while the images are being handled by the various in-house systems.

Still referring to FIG. 1, image quality inspection platform 106 includes codeline data matching algorithm(s) and operator decisioning capability, along with the ability to determine confidence scores using confidence data 108. A messaging facility, 110, is provided for communicating between enterprise applications and platforms. This messaging facility can be via secured dedicated communication channels such as a secured intranet or via a secured "pipe" over the public Internet as is known in the art. Long-term image archive 112 and associated management system 114 provide long term check image storage. This archive typically also provides images that are reviewed by on-line banking customers. Often, such an archive is maintained by a check archive services provider, as is known in the art.

The confidence data discussed above is the result of the codeline recognition and comparison. When the image quality inspection platform analyzes the optical read of the MICR font, the algorithm may not be 100% certain of a character. For example, the algorithm may not be sure that an '8' is an '8'—perhaps it is a '3'. Because of partial codeline misreads, a small percentage of digits may be permitted to differ between the OCR and MICR reads before an image is flagged as a codeline defect. The algorithm scores the overall match on a confidence scale from 0% to 100%. Users can then set thresholds for various actions to take place. This confidence data has to be stored in order for the image transaction management platform to decide what to do and in order to provide analytical data for problem management and analysis.

Figures 2, 2A:
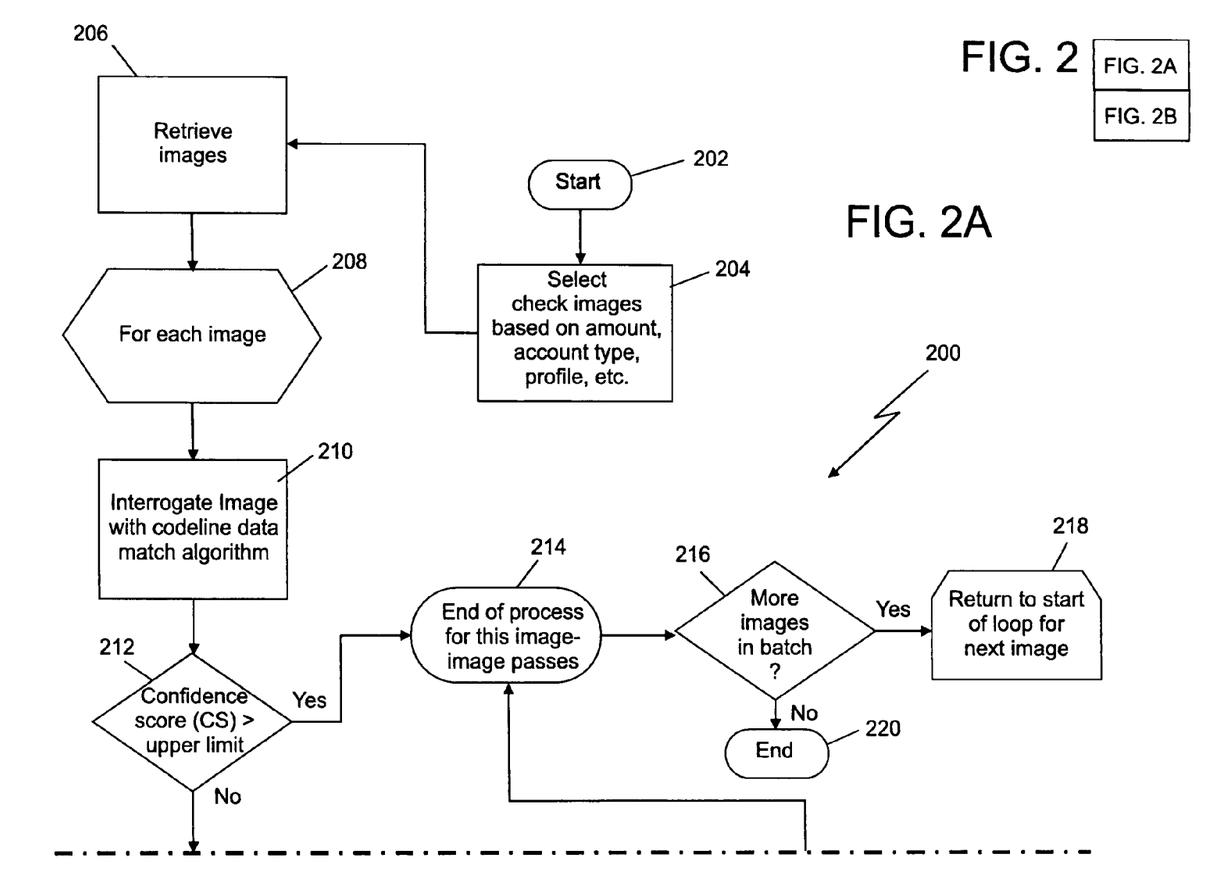
FIGS. 2A and 2B are a flowchart illustrating the method of the invention according to at least one example embodiment.
Figure 2B:
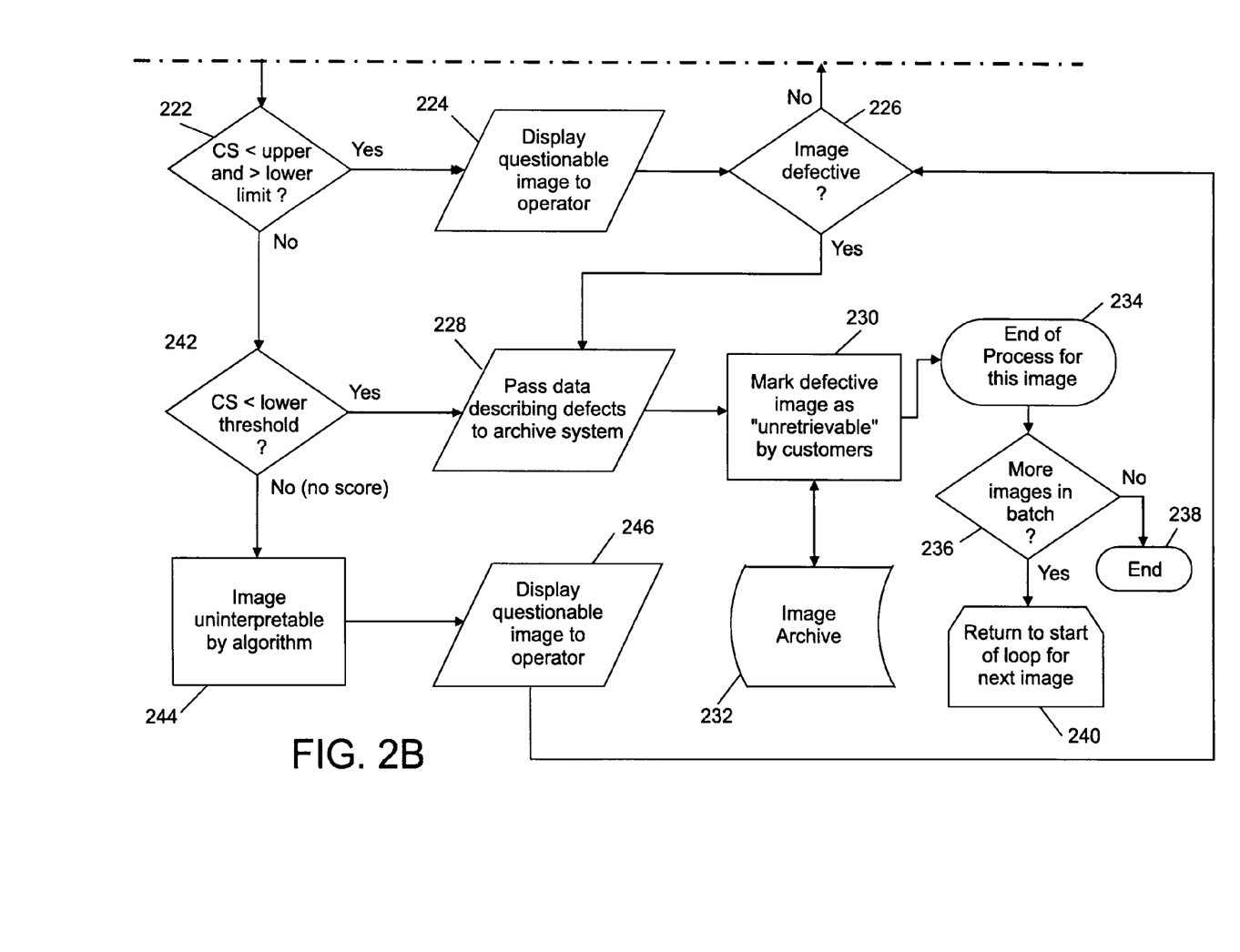

FIGS. 2A and 2B are a flowchart showing the process of example embodiments of the invention. Like most flowcharts, FIGS. 2A and 2B present process 200 as a series of process blocks, illustrating the various steps and or subprocesses that are performed in example embodiments. Process 200 begins at block 202. At block 204, a population of check images is selected for analysis by the image transaction management platform. This selection may be based on work type, process flow, amount, customer type, or other profile data intended to analyze only the necessary images to satisfy customer requirements. The images are retrieved from short-term check image storage and supplied to the image quality inspection system at block 206.

Still referring to FIGS. 2A and 2B, the remainder of process 200 is repeated for each image of the selected images, as indicated by the "for each image" loop block, 208. This presentation is not meant to suggest that multiple images are not handled in parallel as would typically be the case, depending on available computing resources. At block 210, an image is interrogated with codeline data matching software, resulting in data containing the corresponding confidence score for a match. The data is screened for a high confidence threshold value, that is, a value that is above an upper pre-set limit, at block 212. If the confidence score is above that threshold, the process is complete for that image as shown at block 214. The image is not defective. If there are more images to screen at block 216, the process repeats at block 218. Otherwise the process ends at block 220.

Assuming the confidence score is below the limit at block 212 of FIGS. 2A and 2B, the data is screened for a questionable confidence threshold value at block 222. Such a value in this embodiment falls below the pre-set limit but above a pre-set threshold. Such questionable images are passed to an operator to review at block 224 and the operator can determine whether the image is a codeline data mismatch. If not, at block 226, the process again ends for the image at block 214.

Otherwise, if the image is defective, data describing the defect can be passed to the archive system at block 228, and the image can be designated as unretrievable at block 230 in the image archive, 232. Typically, this indication would only be stored in the long-term archive, since that is where image copies that can be accessed by customers reside. Again, the process ends for the current image at block 234. If there are no more images to process at block 236, the process ends at block 238. If there are more images, the process loops back at block 240 to handle the next image.

Still referring to FIGS. 2A and 2B, if the confidence score for the image being handled is not in the intermediate range at block 222, a determination is made at block 242 as to whether the score is below the pre-set threshold. If so, it can be safely assumed the image is defective and the appropriate indications are automatically made at block 228 and 230, without the need for operator review. Otherwise, a confidence score could not be calculated because the image was not able to be interpreted by the codeline data matching algorithm, and such an indication is made in the system at block 244. In such a case, the image is again displayed to an operator at block 246, and the operator decisioning process previously described continues from block 226. It should be noted that when an image is marked unretrievable the system can be set up so that a replacement document with an explanatory message is displayed to a customer who tried to access the image. In example embodiments, defective images are still retained in the long term archive for retrieval by bank personnel if necessary.

It should be noted that the use of the terms "threshold" and "limit" herein is for convenience only, the former being used to refer to the lower confidence score value used in the embodiment of the process shown in FIGS. 2A and 2B, and the latter being used for the upper confidence score value. These values can be set by engineering decision to minimize operator intervention for a given operation. Whether the comparisons made with the actual confidence score include or exclude values equal to the limit and/or threshold is likewise, an engineering choice. A process could also be developed within the scope of the invention that only uses one cut-off value and completely eliminates operator intervention by either accepting a higher rate of unmarked defective images or images falsely designated as defective.

Figure 3:
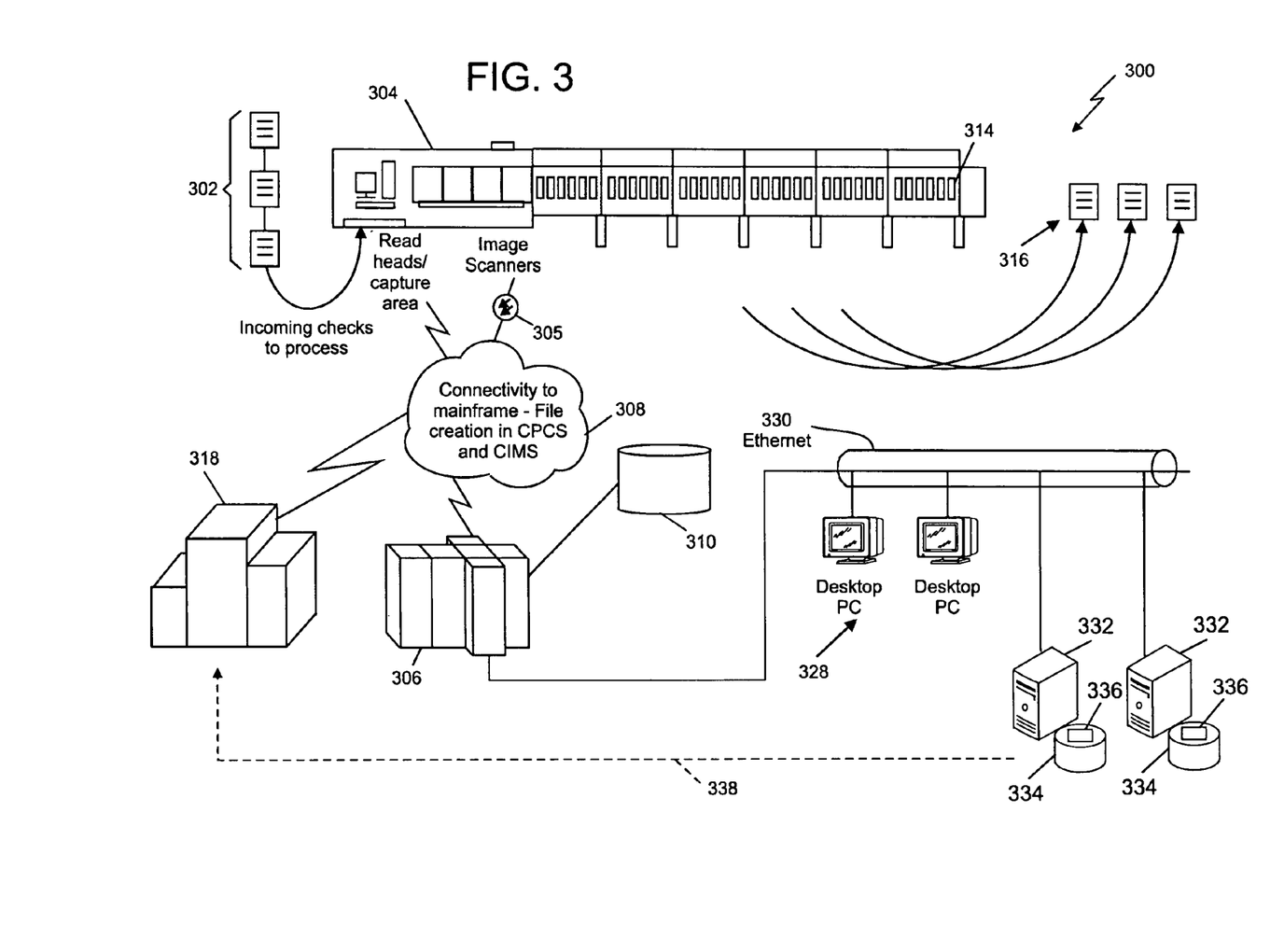
FIG. 3 is a detailed system block diagram according to at least one example embodiment of the invention.

FIG. 3 provides detail of an example real-world implementation of the invention. In system 300 of FIG. 3, incoming paper items, in this case checks are shown at 302. The documents are sorted and read at a high-speed sorter, 304, for example, an IBM 3890 high-speed sorter. The checks pass through a capture area where read heads capture the MICR data and organize it into stored fields. Images are captured and image data 305 is transmitted to computer system 306 via connectivity 308. Computing system 306 serves as the image transaction management platform. Connectivity 308 can be provided by any of various types of networks, for example, an internet protocol (IP) network, or a local area network (LAN). In this example, computing system 306 stores images and data in short term archive 310. The paper items, after they have been imaged, are sorted into pockets 314. Sorted, boxed items 316 are then stored, forwarded onto other banks, or otherwise properly routed within the financial institution. It should be noted that in some institutions using exclusively image-based processing, sorted items 316 might be simply stored and eventually destroyed.

Still referring to FIG. 3, connectivity 308 also provides a connection through external means (not shown) to long-term storage archive 318. Information can be forwarded to the long-term archive via a secure connection such as a virtual private network (VPN) connection or a secure sockets layer (SSL) connection.

It cannot be over emphasized that the system at FIG. 3 is provided as an illustrative example only. There are numerous types of document sorting systems that can be used to provide the appropriate functions. Most sorters typically have conventional document diverting mechanisms which rout the documents to various pockets. The sorter also captures MICR data, and scans the front and back of documents to capture the appropriate images. Also, the long term archive may not be external, but may be internal to the enterprise, even directly connected to the computer system that implements the image transaction management platform. Although computing platform 306 in FIG. 3 is schematically illustrated as a "mainframe" computer, the computing platform could also be a server, workstation, or even a desktop or personal computer given the processing power that has been achieved in such devices in recent years.

In FIG. 3, a number of operator terminals, 328, are interfaced to computer system 306 by Ethernet 330. These operator terminals are used to review images in the case where a confidence score for an item is in the intermediate range as previously discussed. Also connected to Ethernet 330 are servers 332, having associated storage media, 334, on which computer program code 336 resides. These servers and the associated computer program code serve as the image quality inspection platforms. This computer program code is a part of a computer program product that in this embodiment is used in carrying out the method of the invention. In at least some embodiments, servers 332 are implemented as Windows™ based platforms, and include the data matching algorithm as previously discussed, as well as computer program code to determine when and how to route images to operators, or to send messages to archive 318 to mark images as unretrievable. The number of servers used would typically vary depending on the volume of images requiring decisioning over time. Note that in example embodiments, these images are already in the archive when this processing takes place. Thus, conceptually, a feedback loop 338 is formed, in which images are acquired, stored in an archive, evaluated via the local area network based system shown, and an indication returns to the archive in which they images are stored.

Any of various known OCR algorithms can be applied to the processes described above by the servers shown in FIG. 3. Specific OCR products are available that have been designed to optically determine and read printed MICR characters. It is also known how to compare the results of more than one algorithm, or the results of an algorithm with stored values and make determinations regarding certain confidence intervals. One way of accomplishing this is via a voting algorithm. Optical character recognition is a mature art and it is readily understood in the data processing arts how to apply it to achieve various results. Various companies produce OCR products and systems for varied applications. In a typical application, a 60-80% confidence score can be used for a lower limit, and a 95-98% confidence score can be used as an upper limit.

The unretrievability and defects in images can be indicated with an embodiment of the invention in the same manner as other information is stored in a typical check processing system. MICR information normally includes the various stored data fields, and what in CIMS and CPCS parlance is referred to as a "string" that includes a "user byte." For example, a string designates an item as valid, or as a reject. In an example CPCS system, good items that are sorted to pockets build an "I-String" within CPCS with a valid user byte. Items with errors can build on the same "I-String" but, with other types of CPCS user bytes. These stored strings can be used to indicate when an image has been inspected in the manner described above, and when an image will download to workstations for verification by an operator referencing an image. User bytes can be defined to indicate the defects that caused the problem (for example, piggyback, image quality problem, interruption in processing). User bytes can also define when an image should be designated unretrievable in the long-term archive. This data can be stored in the image transaction management platform in the normal fashion, and then messages can be automatically generated and sent to the long-term image archive to make the appropriate indication in the data structures containing the MICR and other data pertaining to the stored images. The information can be stored and pushed to the archive in a batch fashion, or messages regarding individual items can be sent in real time.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of restricting access to images in a financial document archive, where each image comprises a magnetic ink character recognition (MICR) codeline, the method comprising:
   interrogating a portion of an image comprising an entire MICR codeline with a data matching algorithm;
   determining whether a confidence score, expressing a likelihood that the portion of the image matches associated stored MICR data, is above a pre-set limit, wherein the pre-set limit is below one-hundred percent;
designating the image as not defective and retrievable by customers from the financial document archive if the confidence score is above the pre-set limit;
determining whether the confidence score is above a pre-set threshold;
designating the image for display to an operator if the confidence score is below the pre-set limit and above the pre-set threshold; and
automatically designating the image as unretrievable by customers from the financial document archive when the confidence score is below the pre-set threshold.

2. The method of claim 1 further comprising:
displaying the image to an operator when the confidence score cannot be determined by the data matching algorithm; and
designating the image as unretrievable by customers from the financial document archive according to an indication made by the operator.

3. The method of claim 1 further comprising sending data describing at least one defect in the image to the financial document archive.

4. The method of claim 1, wherein the confidence score for the pre-set limit is within the range of ninety-five percent to ninety-eight percent inclusive, and wherein the confidence score for the pre-set threshold is within the range of sixty to eighty percent inclusive.

5. The method of claim 2 further comprising sending data describing at least one defect in the image to the financial document archive.

6. A non-transitory computer program product for restricting access to images in a financial document archive, where each image comprises a magnetic ink character recognition (MICR) codeline, the computer program product including a computer-readable medium having computer program code embodied therein, the computer program code comprising:
instructions for interrogating a portion of an image comprising an entire MICR codeline with a data matching algorithm;
instructions for determining whether a confidence score, expressing a likelihood that the portion of the image matches associated stored MICR data, is above a pre-set limit, wherein the pre-set limit is below one-hundred percent;
instructions for designating images as not defective and retrievable by customers from the financial document archive if the confidence score is above the pre-set limit;
instructions for determining whether the confidence score is above a pre-set threshold;
instructions for designating images for display to an operator if the confidence score is below the pre-set limit and above the pre-set threshold; and
instructions for automatically designating images as unretrievable by customers from the financial document archive when the confidence score is below the pre-set threshold.

7. The computer program product of claim 6, further comprising:
instructions for displaying images to an operator when the confidence score cannot be determined by the data matching algorithm; and
instructions for designating images as unretrievable by customers from the financial document archive according to an indication made by the operator.

8. The computer program product of claim 6; wherein the computer program code further comprises instructions for sending data describing at least one defect in the image to the financial document archive.

9. Apparatus for restricting access to images in a financial document archive, where each image comprises a magnetic ink character recognition (MICR) codeline, the apparatus comprising:
means for interrogating a portion of an image comprising an entire MICR codeline with a data matching algorithm;
means for determining whether a confidence score, expressing a likelihood that the portion of the image matches associated stored MICR data, is above a pre-set limit, wherein the pre-set limit is below one-hundred percent;
means for designating images as not defective and retrievable by customers from the financial document archive if the confidence score is above the pre-set limit;
means for determining whether the confidence score is above a pre-set threshold;
means for designating images for display to an operator if the confidence score is below the pre-set limit and above the pre-set threshold; and
means for automatically designating images as unretrievable by customers from the financial document archive when the confidence score is below the pre-set threshold.

10. The apparatus of claim 9 further comprising:
means for displaying images to an operator when the confidence score cannot be determined by the data matching algorithm; and
means for designating images as unretrievable by customers from the financial document archive according to an indication made by the operator.

11. The apparatus of claim 9; further comprising means for sending data describing at least some defects in the images to the financial document archive.

12. A system for restricting access to images of financial documents, where each image comprises a magnetic ink character recognition (MICR) codeline, the system comprising:
an image transaction platform for retrieving the images;
an image quality inspection platform operatively connected to the image transaction platform to:
interrogate a portion of and image comprising an entire MICR codeline with a data matching algorithm;
determine whether a confidence score, expressing a likelihood that the portion of the image matches associated stored MICR data, is above a pre-set limit; and
determine whether the confidence is above a pre-set threshold;
connectivity to image processing systems to designate the image as not defective and retrievable by customers from the financial document archive if the confidence score is above the pre-set limit, wherein the pre-set limit is below one-hundred ent;
connectivity to an operator platform to display the image to an operator when the confidence score is below the pre-set limit and above the pre-set threshold; and
connectivity to a long-term image archive to automatically mark the image as unretrievable by a customer from the long-term image archive when the confidence score is below the pre-set threshold.

13. The system of claim 12, wherein the operator platform is further operable to display the image to an operator when the confidence score cannot be determined by the data matching algorithm.

14. The system of claim 12 wherein the operator platform is further operable to cause the image quality inspection platform to mark the image in accordance with an indication from an operator.

15. The system of claim 12, wherein the operator platform is further operable to:
- display the image to an operator when the confidence score cannot be determined by the data matching algorithm; and
- designate the image as unretrievable by customers from the financial document archive according to an indication made by the operator.

16. The system of claim 12, wherein the confidence score for the pre-set limit is within the range of ninety-five percent to ninety-eight percent inclusive, and wherein the confidence score for the pre-set threshold is within the range of sixty to eighty percent inclusive.

17. An apparatus comprising:
- an image transaction device for retrieving an image of a financial document, where the image comprising a magnetic ink character recognition (MICR) codeline; and
- an image quality inspection device comprising a processor operatively connected to the image transaction device and configured to:
  - interrogate a portion of an image comprising an entire MICR codeline to determine a confidence score for the image, wherein the confidence score expresses a likelihood that optical character recognition (OCR) data obtained from the portion of the image matches associated MICR data obtained from the financial document;
  - determine whether the confidence score is within a range of values, wherein the range of values is between a first threshold and a second threshold, wherein the first threshold is a value less than a maximum possible confidence score;
  - determine that the image is not defective and permit customer access to the image when the confidence score is outside the range on the first threshold's side of the range;
  - display the image to an operator when the confidence score is within the range; and
  - automatically restrict customer access to the image when the confidence score is outside the range on the second threshold's side of the range.

18. The apparatus of claim 17, wherein the financial document comprises a check.

19. A computer-implemented method of restricting access to images in a financial document archive, where each image comprising a magnetic ink character recognition (MICR) codeline, the method comprising:
- determining a confidence score for an image of a financial document, wherein the confidence score expresses a likelihood that optical character recognition (OCR) data obtained from a portion of an image comprising the entire MICR codeline matches associated MICR data obtained from the financial document;
- determining whether the confidence score is within a range of values, wherein the range of values is between a first threshold and a second threshold, wherein the first threshold is a value less than a maximum possible confidence score;
- determining that the image is not defective and permitting customer access to the image when the confidence score is outside the range on the first threshold's side of the range;
- displaying the image to an operator when the confidence score is within the range; and
- restricting customer access to the image when the confidence score is outside the range on the second threshold's side of the range.

20. The method of claim 1 further comprising storing the image for future retrieval when the image is designated as unretrievable.

21. The computer program product of claim 6, further comprising:
- instructions for storing the image for future retrieval when the image is designated as unretrievable.

22. The apparatus of claim 9 further comprising:
- means for storing the image for future retrieval when the image is designated as unretrievable.

23. The system of claim 12 wherein the image transaction platform is further operable to:
- store the image for future retrieval when the image is designated as unretrievable.

24. The apparatus of claim 17 wherein the image quality inspection device comprising the processor operatively connected to the image transaction device is further configured to:
- store the image for future retrieval when the image is restricted from customer access.

25. The computer-implemented method of claim 19, the method further comprising:
- storing the image for future retrieval when the image is designated as unretrievable.

* * * * *